US008081148B2

(12) United States Patent
Abe et al.

(10) Patent No.: US 8,081,148 B2
(45) Date of Patent: Dec. 20, 2011

(54) DISPLAY DEVICE (75) Inventors: Hiroyuki Abe, Chiba (JP); Saori Sugiyama, Chosei (JP); Hiroaki Asuma, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1056 days.

(21) Appl. No.: 11/936,116

(22) Filed: Nov. 7, 2007

(65) Prior Publication Data
US 2008/0129674 A1 Jun. 5, 2008

(30) Foreign Application Priority Data
Nov. 7, 2006 (JP) .................................. 2006-301088

(51) Int. Cl.
*G09G 3/36* (2006.01)
(52) U.S. Cl. .............................. 345/92; 345/91; 313/432
(58) Field of Classification Search .................... 345/85, 345/91–93; 313/423; 349/43; 369/126
See application file for complete search history.

(56) References Cited

U.S. PATENT DOCUMENTS

| 5,930,607 | A | * | 7/1999 | Satou | 438/158 |
| 6,340,963 | B1 | * | 1/2002 | Anno et al. | 345/92 |
| RE38,292 | E | * | 10/2003 | Satou | 438/158 |
| 6,947,103 | B2 | * | 9/2005 | Sakurai et al. | 349/43 |
| 7,453,420 | B2 | * | 11/2008 | Watanabe et al. | 345/55 |
| 7,928,946 | B2 | * | 4/2011 | Yamazaki et al. | 345/92 |
| 2003/0063229 | A1 | * | 4/2003 | Takahashi et al. | 349/43 |
| 2005/0052391 | A1 | * | 3/2005 | Yamazaki et al. | 345/92 |

* cited by examiner

*Primary Examiner* — Kimnhung Nguyen
(74) *Attorney, Agent, or Firm* — Antonelli, Terry, Stout & Kraus, LLP.

(57) ABSTRACT

The present invention prevents electrostatic breakdown attributed to static electricity even in and after a cell cutting step. In a display device which includes a substrate, a plurality of pixels which is formed in a pixel part, a plurality of video lines which applies video voltages to the plurality of pixels, and a video voltage selection circuit which selects the video voltages to be inputted to the pixels and applies the selected video voltages to the predetermined video lines among the plurality of video lines, an electrostatic protective circuit for protecting a pixel part is connected to the plurality of video voltage inputting lines which inputs the video voltages to the video voltage selection circuit, and an electrostatic protective circuit for protecting a peripheral circuit is connected to the lines other than the video voltage inputting lines which is connected to the video voltage selection circuit. The electrostatic protective circuit for protecting the pixel part is connected between the plurality of video voltage inputting lines, and the electrostatic protective circuit for protecting the peripheral circuit is connected between at least one video voltage inputting line and the line other than the at least one video voltage inputting line, between the plurality of lines other than the video voltage inputting lines, and between the line other than the at least one video voltage inputting line and a reference voltage line to which a reference voltage is applied.

21 Claims, 6 Drawing Sheets

DISPLAY DEVICE

CROSS-REFERENCE TO RELATED APPLICATIONS

The disclosure of Japanese Patent Application No. 2006-301088 filed on Nov. 7, 2006 including the specification, drawings and abstract is incorporated herein by reference in its entirety.

BACKGROUND OF THE INVENTION

1. Field of the Invention

The present invention relates to a display device, and more particularly to a display device which arranges a protective element (diode element) for electrostatic protection in the inside of a display panel.

2. Description of Related Arts

A TFT-type liquid crystal display module which uses thin film transistors as active elements can display a high-definition image and hence, the liquid crystal display module has been used as display devices of television receiver sets, displays of personal computers and the like. Particularly, a miniaturized TFT-type liquid crystal display device has been popularly used as a display part of a mobile phone.

In general, in the liquid crystal display module, in a region surrounded by two neighboring scanning lines (also referred to as gate lines) and two neighboring video lines (also referred to as source lines or drain lines), a thin film transistor which is turned on in response to a scanning signal from the scanning line and a pixel electrode to which the video signal from the video line is transmitted via the above-mentioned thin film transistor are formed thus constituting a so-called pixel.

Figure 8:
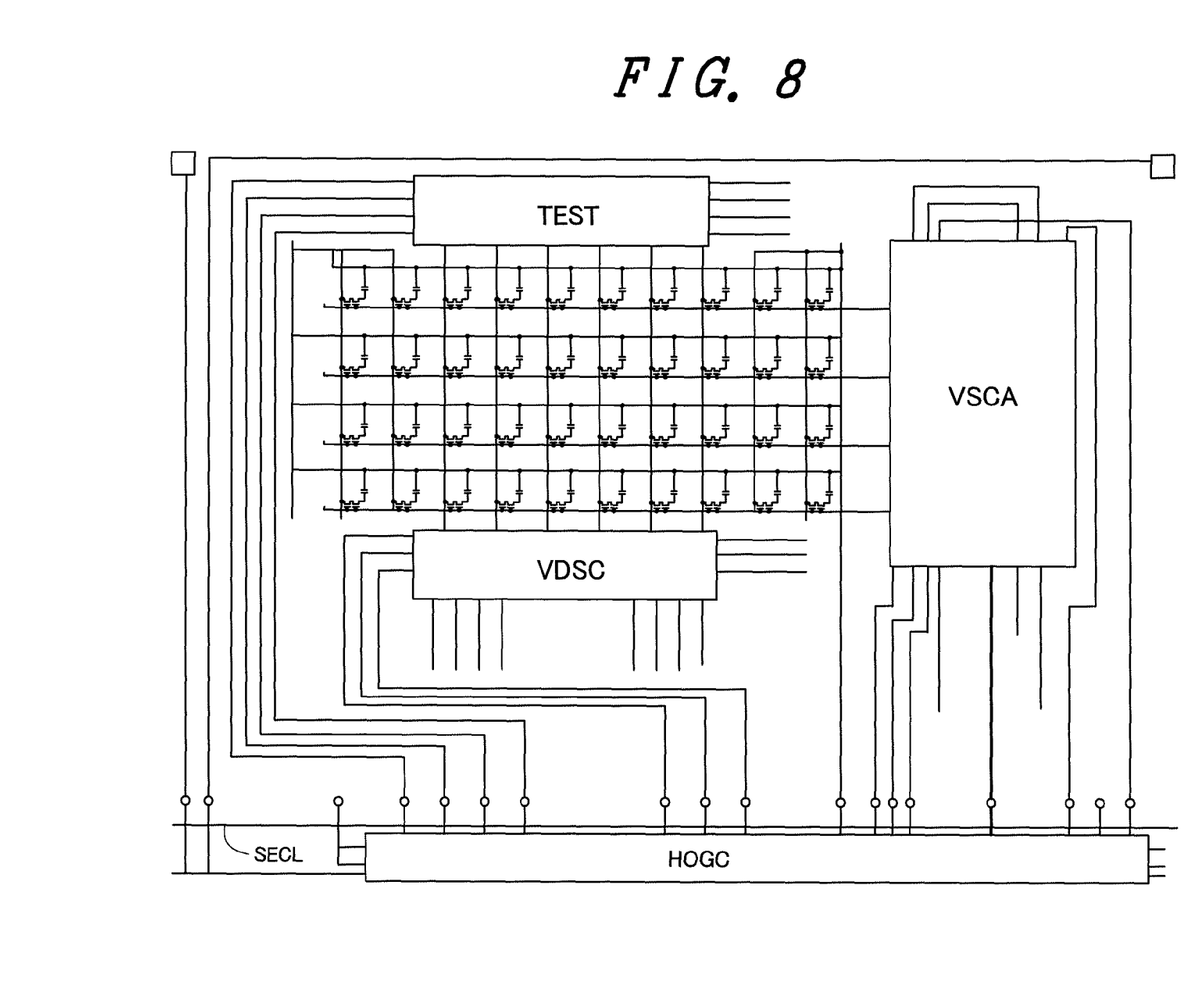
FIG. 8 is a view for explaining a first substrate before a cell cutting step in a conventional liquid crystal display module.

Conventionally, to prevent electrostatic breakdown attributed to static electricity (for example, breaking of the thin film transistor attributed to static electricity or the like) during manufacturing steps of the liquid crystal display panel, as shown in FIG. 8, a protective circuit (HOGC) is formed on one of substrates which constitute the liquid crystal display panel on an outer portion of the substrate.

Particularly, among thin film transistors, the thin film transistor which uses polysilicon as a material of a semiconductor layer exhibits, compared to a thin film transistor which uses amorphous silicon as a material of a semiconductor layer, high performance as an MOS transistor but a low breakdown voltage and hence, the thin film transistor which uses the polysilicon-made semiconductor layer requires protection against electrostatic breakdown attributed to static electricity. In FIG. 8, symbol VDSC indicates a video voltage selection circuit, symbol VSCA indicates a vertical scanning circuit, symbol TEST indicates an inspection circuit, and symbol SECL indicates a cell cutting line.

SUMMARY OF THE INVENTION

As mentioned previously, to prevent electrostatic breakdown attributed to static electricity, conventionally, on one of substrates which constitutes the liquid crystal display panel, the protective circuit (HOGC) is formed outside the cell cutting line (SECL) shown in FIG. 8.

However, in a cell cutting step after forming the liquid crystal display panel by overlapping one substrate and another substrate to each other, one substrate is cut along the cell cutting line (SECL) shown in FIG. 8 and hence, there arises a drawback that it is impossible to prevent electrostatic breakdown attributed to static electricity by this protective circuit (HOGC) in and after the cell cutting step.

The present invention has been made to overcome the above-mentioned drawback of the related art, and it is an object of the present invention to provide a technique, in a display device, which can prevent electrostatic breakdown attributed to static electricity even in and after a cell cutting step.

The above-mentioned and other objects and novel features of the present invention will become apparent from the description of this specification and attached drawings.

To briefly explain the summary of typical inventions among the inventions disclosed in this specification, they are as follows.

(1) In a display device which includes a substrate, a plurality of pixels formed in a pixel part, and a plurality of video lines which applies video voltages to the plurality of pixels, an electrostatic protective circuit for protecting the pixel part is connected to the plurality of video lines.

(2) In the display device having the constitution (1), the electrostatic protective circuit for protecting the pixel part is connected between the plurality of video lines, and an electrostatic protective circuit for protecting a peripheral circuit is connected between at least one video line and a reference voltage line to which a reference voltage is applied.

(3) In a display device which includes a substrate, a plurality of pixels which is formed in a pixel part, a plurality of video lines which applies video voltages to the plurality of pixels, and a video voltage selection circuit which selects the video voltages to be inputted to the pixels and applies the selected video voltages to the predetermined video lines among the plurality of video lines, an electrostatic protective circuit for protecting a pixel part is connected to the plurality of video voltage inputting lines which inputs the video voltages to the video voltage selection circuit, and an electrostatic protective circuit for protecting a peripheral circuit is connected to the lines other than the video voltage inputting lines which is connected to the video voltage selection circuit.

(4) In the display device having the constitution (3), the electrostatic protective circuit for protecting the pixel part is connected between the plurality of video voltage inputting lines, and the electrostatic protective circuit for protecting the peripheral circuit is connected between the at least one video voltage inputting line and the line other than the at least one video voltage inputting line, between the plurality of lines other than the video voltage inputting lines, and between the line other than the at least one video voltage inputting line and a reference voltage line to which a reference voltage is applied.

(5) In the display device having any one of the constitutions (1) to (4), the display device includes a plurality of scanning lines which applies scanning voltages to the plurality of pixels, and the electrostatic protective circuit for protecting the pixel part is connected between the plurality of scanning lines and the reference voltage line to which the reference voltage is applied.

(6) In the display device having the constitution (5), the display device includes a scanning circuit which applies the scanning voltages to the plurality of scanning lines, and the electrostatic protective circuit for protecting the peripheral circuit is connected to a plurality of lines which is connected to the scanning circuit.

(7) In the display device having the constitution (6), the electrostatic protective circuit for protecting the peripheral circuit is connected between the plurality of lines which is connected to the scanning circuit, and between the at least one line which is connected to the scanning circuit and the reference voltage line to which the reference voltage is applied.

(8) In the display device having any one of the constitutions (1) to (7), the display device includes a counter voltage line which applies a counter voltage to the plurality of pixels, and the electrostatic protective circuit for protecting the peripheral circuit is connected between the counter voltage line and the reference voltage line to which the reference voltage is applied.

(9) In the display device having any one of the constitutions (1) to (8), the display device includes an inspection circuit to which one ends of the plurality of video lines on a side opposite to a side to which the video voltages are applied are connected, and the electrostatic protective circuit for protecting the peripheral circuit is connected to a plurality of lines which is connected to the inspection circuit.

(10) In the display device having the constitution (9), the electrostatic protective circuit for protecting the peripheral circuit is connected between the plurality of lines which is connected to the inspection circuit, and between the at least one line which is connected to the inspection circuit and the reference voltage line to which the reference voltage is applied.

(11) In the display device having any one of the constitutions (1) to (10), either the electrostatic protective circuit for protecting the pixel part or the electrostatic protective circuit for protecting the peripheral circuit is constituted of a pair of diodes which has cathodes thereof connected to each other.

(12) In the display device having any one of the constitutions (1) to (10), either the electrostatic protective circuit for protecting the pixel part or the electrostatic protective circuit for protecting the peripheral circuit is constituted of first to fourth diodes which are connected in series, wherein the first diode and the second diode have cathodes thereof connected to each other, and the third diode and the fourth diode have cathodes thereof connected to each other.

(13) In the display device having the constitution (11) or (12), the diode is a diode-connected MOS transistor.

(14) In the display device having any one of the constitutions (2) to (10), the electrostatic protective circuit for protecting the pixel part is constituted of a pair of diodes which has cathodes thereof connected to each other, and the electrostatic protective circuit for protecting the peripheral circuit is constituted of first to fourth diodes which are connected in series, wherein the first diode and the second diode have cathodes thereof connected to each other, and the third diode and the fourth diode have cathodes thereof connected to each other.

(15) In the display device having the constitution (14), the diode is a diode-connected MOS transistor.

(16) In the display device having the constitution (15), the diode-connected MOS transistor which constitutes the first to fourth diodes which are connected in series has a gate width thereof set larger than a gate width of the diode-connected MOS transistor which constitutes the pair of diodes.

(17) In the display device having the constitution (16), the gate width of the diode-connected MOS transistor which constitutes the first to fourth diodes which are connected in series is set to a value three times to five times as large as the gate width of the diode-connected MOS transistor which constitutes the pair of diodes.

To briefly explain advantageous effects obtained by the typical inventions among the inventions disclosed in this specification, they are as follows.

According to the display device of the present invention, it is possible to prevent electrostatic breakdown attributed to static electricity even in and after a cell cutting step.

DESCRIPTION OF THE PREFERRED EMBODIMENTS

Hereinafter, an embodiment of the present invention is explained in detail in conjunction with drawings.

Here, in all drawings for explaining the embodiment, parts having identical functions are given same numerals and their repeated explanation is omitted.

In the following embodiment, the explanation is made with respect to an example in which the present invention is applied to a liquid crystal display device as one example of a display device.

Figure 1:
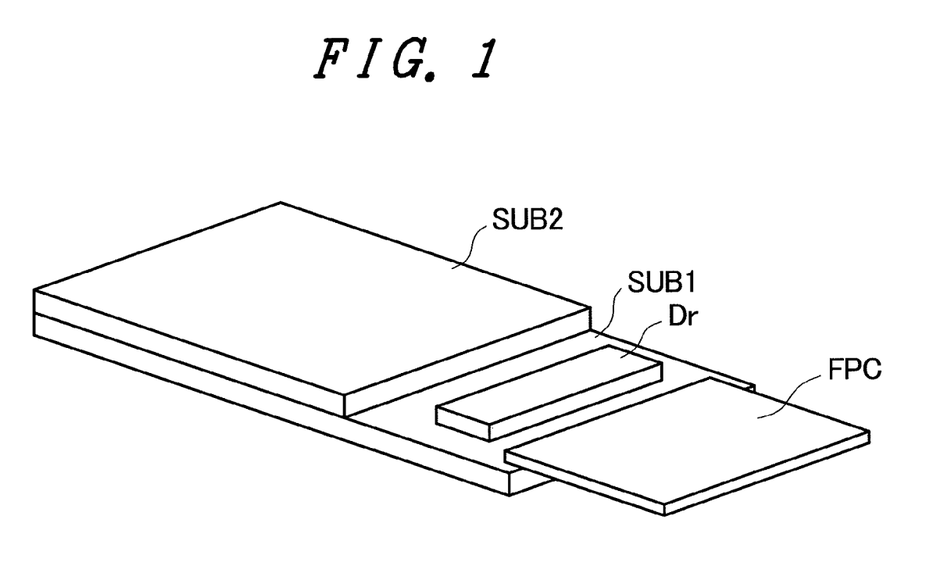
FIG. 1 is a perspective view showing the schematic constitution of a liquid crystal display panel of a liquid crystal display module of an embodiment according to the present invention.

FIG. 1 is a perspective view showing the schematic constitution of a liquid crystal display panel of a liquid crystal display module of the embodiment according to the present invention.

The liquid crystal display module of this embodiment is a miniaturized TFT-type liquid crystal display module used as a display part of a mobile phone.

As shown in FIG. 1, the liquid crystal display panel of this embodiment is configured as follows. A first substrate (also referred to as a TFT substrate or an active matrix substrate) (SUB1) on which pixel electrodes, thin film transistors and the like are formed and a second substrate (also referred to as a counter substrate) (SUB2) on which color filters and the like are formed are overlapped to each other with a predetermined gap therebetween. Both substrates are adhered to each other using a frame-shaped sealing material formed between both substrates in the vicinity of peripheral portions of both substrates. Liquid crystal is filled and sealed in the inside of a space defined by both substrates and the sealing material through a liquid crystal filling port formed in a portion of the sealing material. Further, polarizers are laminated to outside portions of both substrates.

In this manner, the liquid crystal display module of this embodiment adopts the structure which sandwiches the liquid crystal between the pair of substrates.

Further, the first substrate (SUB1) has an area larger than an area of the second substrate (SUB2), and a semiconductor chip (Dr) which constitutes a driver for driving the thin film transistors is mounted on a region of the first substrate (SUB1) which does not face the second substrate (SUB2) in an opposed manner. Further, a flexible printed circuit board (FPC) is mounted on a peripheral portion of one side of the region. Although a case in which the display device is driven by the semiconductor chip (Dr) is exemplified in this embodiment, the drive circuit may be incorporated in the first substrate (SUB1) as an integral part thereof by forming the drive circuit using a thin film transistor or the like.

A material of the substrates is not limited to glass and may be plastic or the like provided that the substrate is made of a material having insulation property.

Further, counter electrodes are formed on a counter substrate side when the display device adopts a TN-type or VA-type liquid crystal display panel. When the display device adopts an IPS type liquid crystal display panel, the counter electrodes are formed on a TFT substrate side.

Here, in the present invention, when parts of the inner structure of the liquid crystal panel are irrelevant to the present invention, the detailed explanation of these parts is omitted. Further, the present invention is applicable to a liquid crystal panel having any structure.

Figure 2:
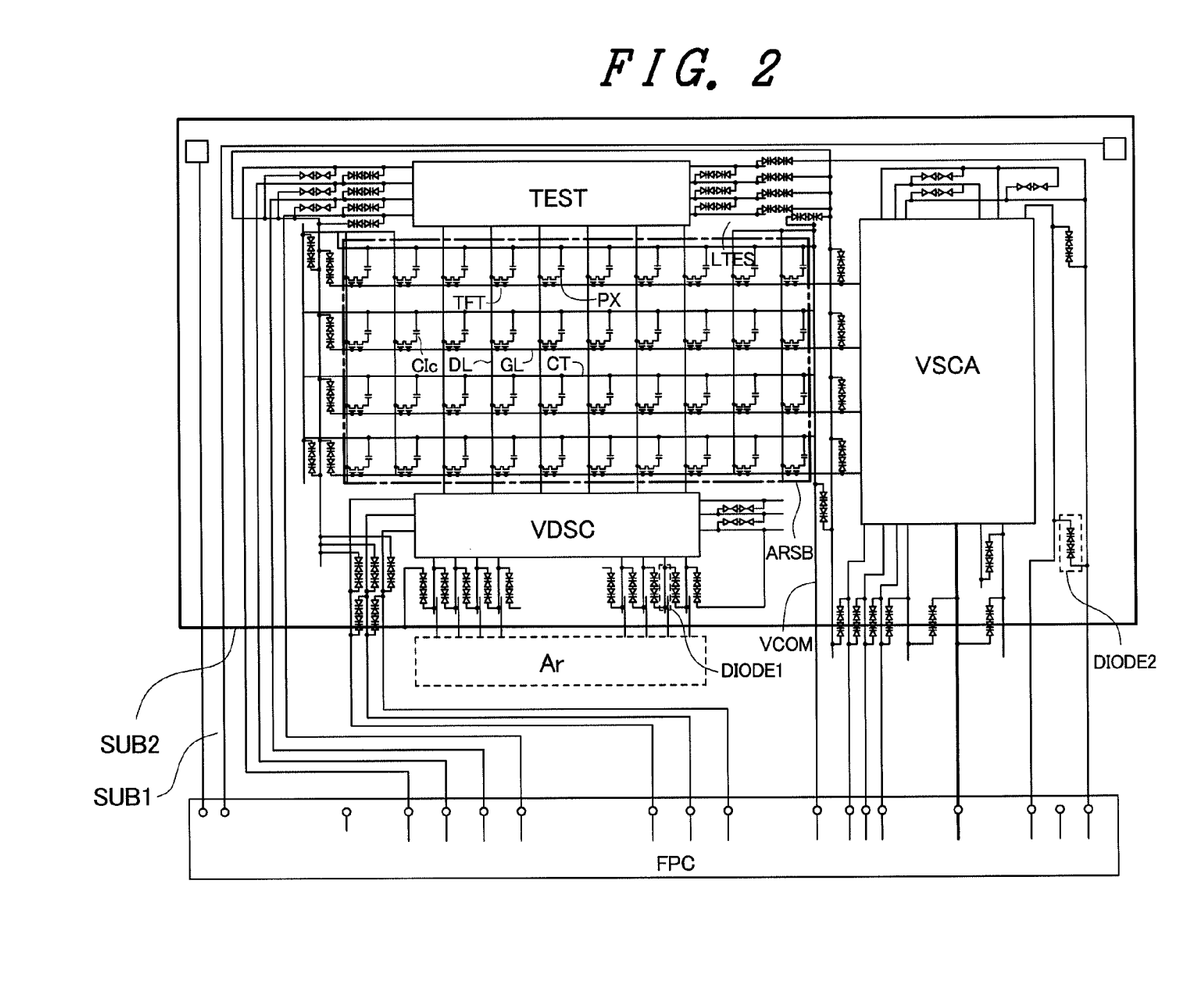
FIG. 2 is a block diagram for explaining a first substrate of the embodiment according to the present invention.

FIG. 2 is a block diagram for explaining the first substrate (SUB1) of this embodiment.

In FIG. 2, symbol ARSB indicates a pixel part, symbol TEST indicates an inspection circuit, and symbol FPC indicates a flexible printed circuit board. Further, symbol Ar indicated by a dotted frame in FIG. 2 indicates a place where the semiconductor chip (Dr) is mounted.

Within the pixel region (ARSB), pixels are formed in a matrix array. Each pixel includes a pixel electrode (PX) and a thin film transistor (TFT) for applying a video voltage to the pixel electrode (PX).

Gate electrodes of the thin film transistors (TFT) in the row direction are connected to a scanning line (GL), and the scanning line (GL) is connected to a vertical scanning circuit (VSCA).

Drain electrodes of the thin film transistors (TFT) in the column direction are connected to a video line (DL), and the video line (DL) is connected to a video voltage selection circuit (VDSC). For example, the video voltages of red (R), green (G), blue (B) are sequentially inputted to the video voltage selection circuit (VDSC), while the video voltage selection circuit (VDSC) outputs the video voltage of red (R), the video voltage of green (G) and the video voltage of blue (B) which are inputted sequentially to the video line for red (R), the video line for green (G) and the video line for blue (B) respectively.

A source electrode of the thin film transistor (TFT) is connected to the pixel electrode (PX). Here, between the pixel electrode (PX) and the counter electrode (CT), a liquid crystal capacitance (Clc) is equivalently formed. Further, the counter electrode (CT) is connected to a counter voltage line (VCOM).

In this embodiment, a scanning voltage of High level which turns on the thin film transistor (TFT) is sequentially applied to the scanning lines (GL). Due to such an operation, the thin film transistors (TFT) on one display line are sequentially turned on and a video voltage on the video line (DL) is applied to the pixel electrodes (PX) on one display line and hence, an image is displayed on the liquid crystal display panel.

The liquid crystal display panel of this embodiment is characterized by arranging an electrostatic protective circuit therein. That is, in this embodiment, in regions which are regions other than the pixel region (ARSB) of the first substrate (SUB1) and face the second substrate (SUB2) in an opposed manner, an electrostatic protective circuit (DIODE1) for protecting the pixel part and an electrostatic protective circuit (DIODE2) for protecting the peripheral circuits are formed.

Figure 3:
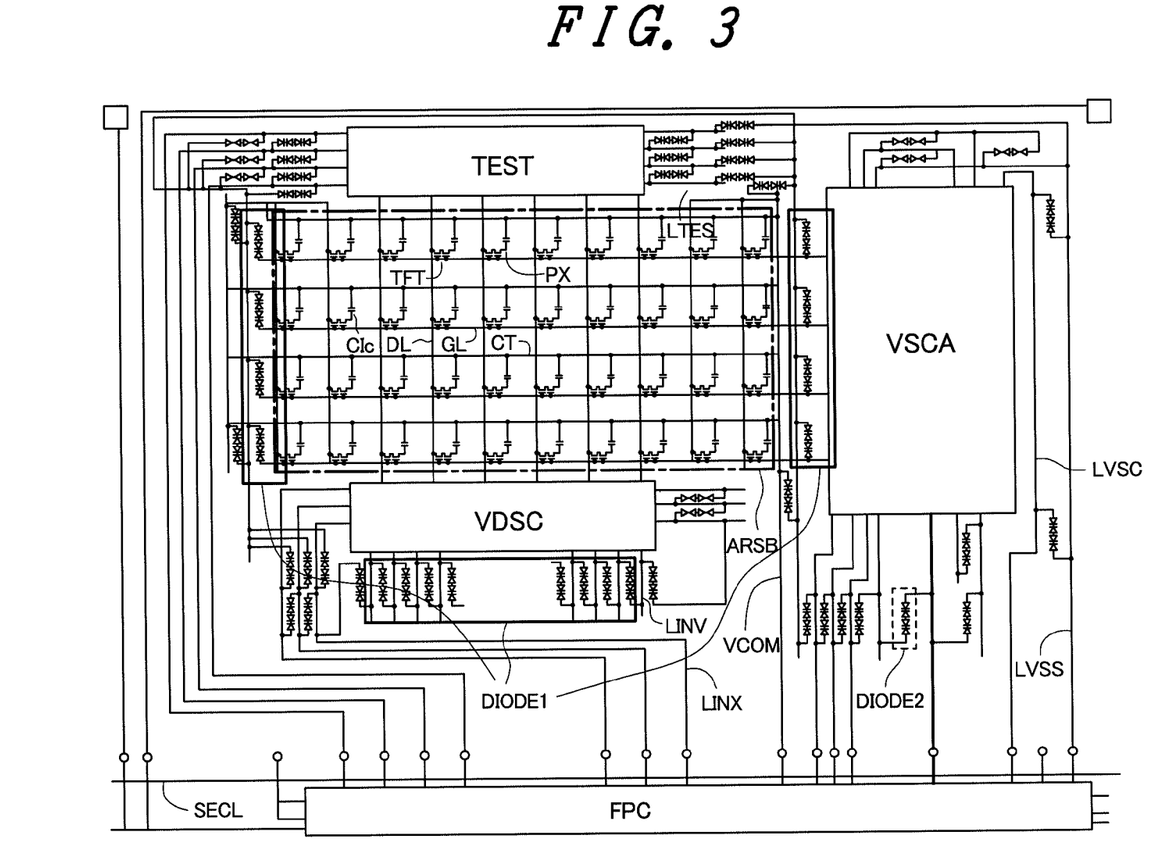
FIG. 3 is a view for explaining the first substrate before a cell cutting step in the liquid crystal display module of the embodiment according to the present invention.

FIG. 3 is a view for explaining the first substrate (SUB1) before a cell cutting step. In FIG. 3, the illustration of the mounting position of the semiconductor chip (Dr) shown in FIG. 2 is omitted.

As shown in FIG. 3, in this embodiment, between a plurality of video voltage inputting lines (LINV) which inputs the video voltages from the semiconductor chip (Dr) to the video voltage selection circuit (VDSC), the electrostatic protective circuit (DIODE1) for protecting the pixel part is connected.

Further, between the at least one video voltage inputting line (LINV) and the line (LINX) other than the video voltage inputting line (LINV) for inputting control signals and the like to the video voltage selection circuit (VDSC), between the plurality of lines (LINX), and between the at least one line (LINX) and a reference voltage line (LVSS) to which a reference voltage (VSS) is applied, the electrostatic protective circuit (DIODE2) for protecting the peripheral circuit is connected. Here, the reference voltage VSS is a gate-off voltage which is applied to the gate electrode of the thin film transistor (TFT).

Here, when the video voltage selection circuit (VDSC) is not used, the electrostatic protective circuit (DIODE1) for protecting the pixel part is connected between the plurality of video lines and, further, the electrostatic protective circuit for protecting the peripheral circuit is connected between the at least one video line and the reference voltage line (LVSS) to which the reference voltage is applied.

Further, between each scanning line (GL) and the reference voltage line (LVSS) to which the reference voltage (VSS) is applied, the electrostatic protective circuit (DIODE1) for protecting the pixel part is connected. Still further, between the plurality of lines (LVSC) which is connected to the vertical scanning circuit (VSCA) as well as between the line (LVSC) which is connected to the at least one vertical scanning circuit (VSCA) and the reference voltage line (LVSS) to which the reference voltage (VSS) is applied, the electrostatic protective circuit (DIODE2) for protecting the peripheral circuit is connected.

Still further, between the counter voltage line (VCOM) and the reference voltage line (LVSS) to which the reference voltage (VSS) is applied, the electrostatic protective circuit (DIODE1) for protecting the pixel part is connected.

Between a plurality of lines (LTES) which is connected to the inspection circuit (TEST), the electrostatic protective circuit (DIODE2) for protecting the peripheral circuit is connected. Further, also between the at least one line (LTES) which is connected to the inspection circuit (TEST) and the reference voltage line (LVSS) to which the reference voltage (VSS) is applied, the electrostatic protective circuit (DIODE2) for protecting the peripheral circuit is connected. Here, one ends (one ends on a side opposite to a side to which grayscale voltages are applied) of the video lines (DL) are connected to the inspection circuit (TEST).

Further, even when lines which are connected to the video voltage selection circuit (VDSC), the vertical scanning circuit (VSCA) or the inspection circuit (TEST) intersect each other between laminated films, the intersecting lines are connected with each other in the electrostatic protective circuit (DIODE2) for protecting the peripheral circuit.

Figure 4A:
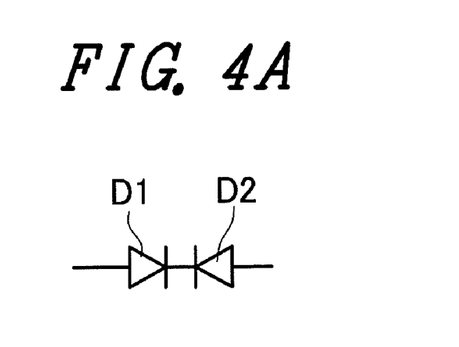
FIG. 4A and FIG. 4B are views showing the circuit constitution of one example of an electrostatic protective circuit for protecting a pixel part or an electrostatic protective circuit for protecting a peripheral circuit of the embodiment according to the present invention.
Figure 4B:
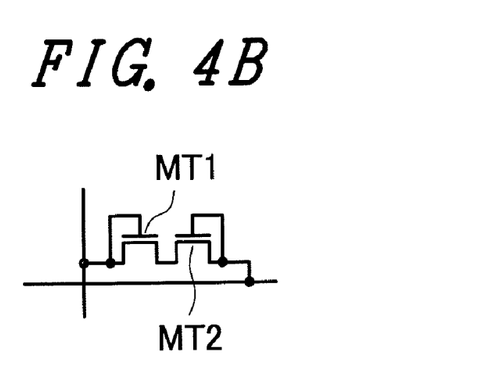

FIG. 4A and FIG. 4B are views showing the circuit constitution of one example of the electrostatic protective circuit (DIODE1) for protecting the pixel part or the electrostatic protective circuit (DIODE2) for protecting the peripheral circuit of this embodiment.

As shown in FIG. 4A, the electrostatic protective circuit (DIODE1) for protecting the pixel part or the electrostatic protective circuit (DIODE2) for protecting the peripheral circuit of this embodiment is constituted of a pair of diodes (D1, D1) which has cathodes thereof connected to each other.

FIG. 4B shows the circuit constitution of the diode circuit shown in FIG. 4A having the 2-MOS-transistor constitution which is constituted of diode-connected n-type MOS transistors (MT1, MT2).

Figure 5A:
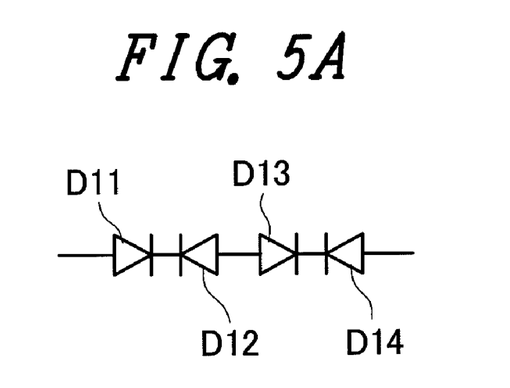
FIG. 5A and FIG. 5B are views showing the circuit constitution of another example of the electrostatic protective circuit for protecting the pixel part or the electrostatic protective circuit for protecting the peripheral circuit of the embodiment according to the present invention.
Figure 5B:
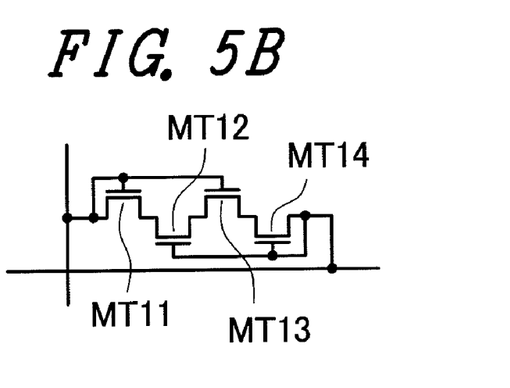

FIG. 5A and FIG. 5B are views showing the circuit constitution of another example of the electrostatic protective circuit (DIODE1) for protecting the pixel part or the electrostatic protective circuit (DIODE2) for protecting the peripheral circuit of this embodiment.

As shown in FIG. 5A, either the electrostatic protective circuit (DIODE1) for protecting the pixel part or the electrostatic protective circuit (DIODE2) for protecting the peripheral circuit of this embodiment is constituted of first to fourth diodes (D11 to D14) which are connected in series, wherein the first diode (D11) and the second diode (D12) have cathodes thereof connected to each other, and the third diode (D13) and the fourth diode (D14) have cathodes thereof connected to each other.

FIG. 5B shows the circuit constitution of the diode circuit shown in FIG. 5A having the 4-MOS-transistor constitution which is constituted of diode-connected n-type MOS transistors (MT11 to MT14).

As shown in FIG. 5A and FIG. 5B, when the electrostatic protective circuit (DIODE1, DIODE2) is constituted of diode-connected MOS transistors (MT1, MT2, MT11 to MT14), to allow a certain degree of current to flow in the n-type MOS transistor, the MOS transistors (MT1, MT2, MT11 to MT14) are required to have a certain degree of gate width (W).

In this case, under an actual driving condition of the liquid crystal display panel, it is necessary to ensure the gate width (W) which can make in-plane charged charges on the liquid crystal display panel uniform while preventing the occurrence of an operation defect attributed to a leaked current of the MOS transistor.

However, in the electrostatic protective circuit (DIODE1) for protecting the pixel part shown in FIG. 3, due to a demand for higher definition of the pixels, narrowing of pitches of the pixels is requested and hence, the increase of the gate width (W) in the 4-MOS-transistor constitution shown in FIG. 5B is difficult in view of a layout space.

Accordingly, by also taking the possibility of imparting redundancy to the electrostatic protective circuit (DIODE2) for protecting the peripheral circuit other than the electrostatic protective circuit (DIODE1) for protecting the pixel part shown in FIG. 3 into consideration, it is preferable to provide the 4-MOS-transistor constitution shown in FIG. 5B to the electrostatic protective circuit (DIODE2) for protecting the peripheral circuit and the 2-MOS-transistor constitution shown in FIG. 4B to the electrostatic protective circuit (DIODE1) for protecting the pixel part shown in FIG. 3.

In such a case, to make the in-plane electrostatic charge quantity uniform on the liquid crystal display panel, it is necessary to supply a substantially equal quantity of current in both of the 2-MOS-transistor constitution and the 4-MOS-transistor constitution.

Figure 6:
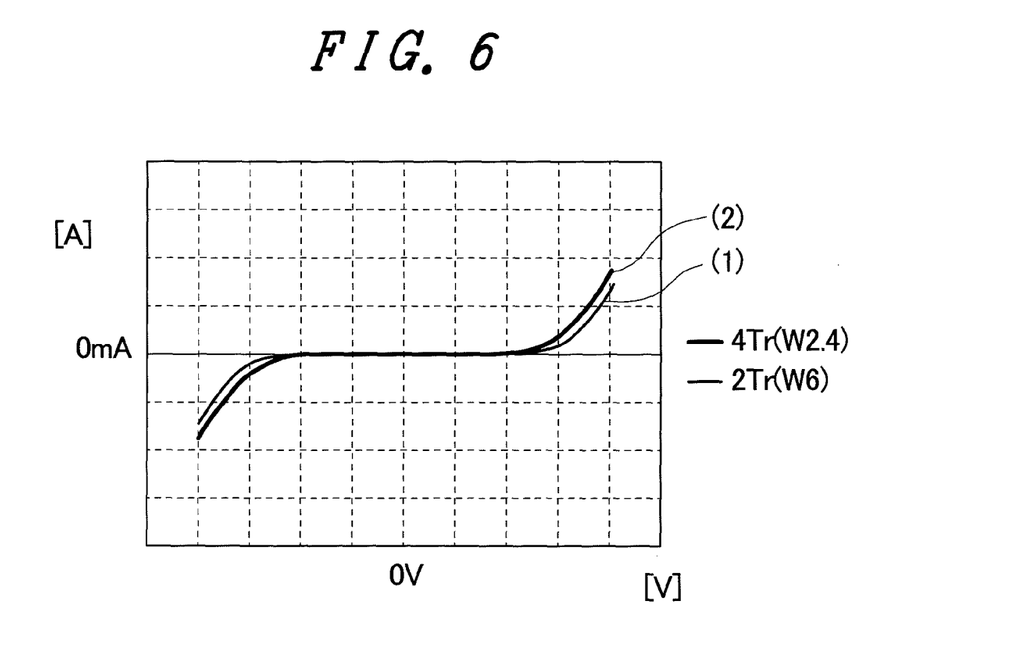
FIG. 6 is a graph showing a simulation result of voltage-current characteristics when the electrostatic protective circuit adopts the 2-MOS-transistor constitution or the 4-MOS-transistor constitution.
Figure 7:
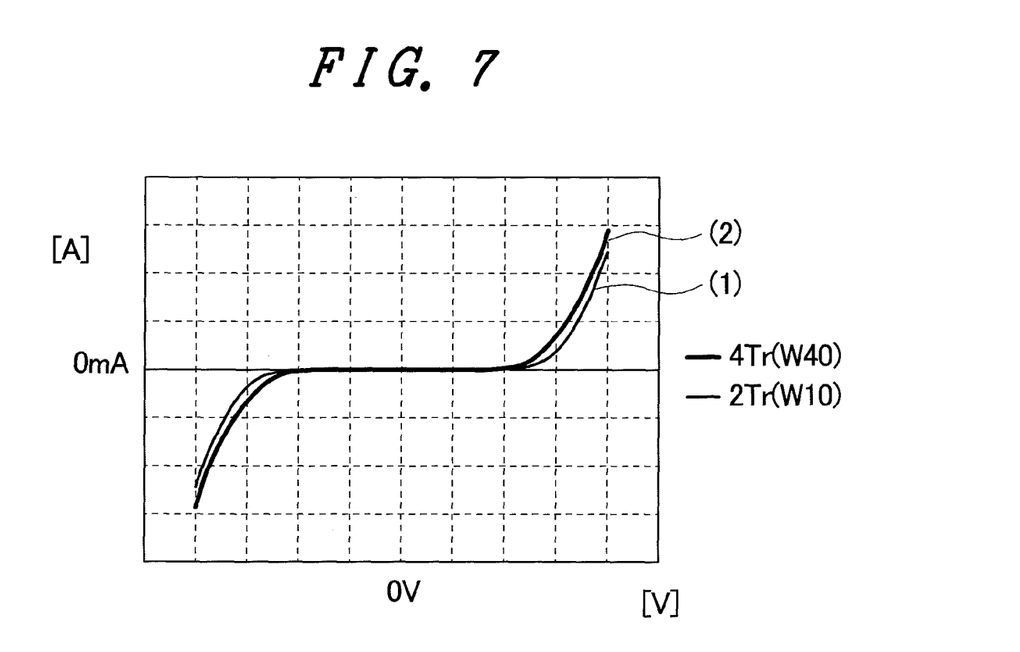
FIG. 7 is a graph showing a simulation result of voltage-current characteristics when the electrostatic protective circuit adopts the 2-MOS-transistor constitution or the 4-MOS-transistor constitution.

FIG. 6 and FIG. 7 show a simulation result of voltage-current characteristics when the electrostatic protective circuit adopts the 2-MOS-transistor constitution and the 4-MOS-transistor constitution. In FIG. 6 and FIG. 7, an applied voltage (unit: V) is taken on an axis of abscissas, and a current (unit: A) is taken on an axis of ordinates.

A curve (1) shown in FIG. 6 indicates the voltage-current characteristic when the electrostatic protective circuit adopts the 2-MOS-transistor constitution and the gate width (W) is 6 μm, and a curve (2) shown in FIG. 6 indicates the voltage-current characteristic when the electrostatic protective circuit adopts the 4-MOS-transistor constitution and the gate width (W) is 24 μm.

A curve (1) shown in FIG. 7 indicates the voltage-current characteristic when the electrostatic protective circuit adopts the 2-MOS-transistor constitution and the gate width (W) is 10 μm, and a curve (2) shown in FIG. 7 indicates the voltage-current characteristic when the electrostatic protective circuit adopts the 4-MOS-transistor constitution and the gate width (W) is 40 μm.

When physically leaked currents in the respective MOS transistors of the peripheral circuit such as the inspection circuit (TEST), the video voltage selection circuit (VDSC) and the vertical scanning circuit (VSCA) and the pixel part (ARSD) are not taken into consideration, due to the simulation result shown in FIG. 6 and FIG. 7, by setting the gate width (W) of the MOS transistor when the electrostatic protective circuit adopts the 4-MOS-transistor constitution approximately four times as large as the gate width (W) of the MOS transistor when the electrostatic protective circuit adopts the 2-MOS-transistor constitution, it is possible to make the currents which flow in the respective MOS transistors substantially equal between the electrostatic protective circuit which adopts the 2-MOS-transistor constitution and the electrostatic protective circuit which adopts the 4-MOS-transistor constitution.

However, to take the actual liquid-crystal-display-panel driving state into consideration, the arrangement position of the MOS transistor which constitutes the electrostatic protective circuit falls within a region where light from a backlight is radiated. Accordingly, to take the influence of a leaked current attributed to a photoconductor into consideration, it is desirable to set the gate width (W) of the MOS transistor when the electrostatic protective circuit adopts the 2-MOS-transistor constitution to a value equal to or less than 10 μm.

Then, assume a case in which the gate width (W) of the MOS transistor when the electrostatic protective circuit adopts the 2-MOS-transistor constitution is 10 μm or less. In such a case, to take leaked currents of the MOS transistors which constitute the peripheral circuits and the pixel part (ARSB), MOS transistor performance irregularity attributed to a manufacturing process and the like into consideration, it is desirable to set the gate width (W) of the MOS transistor when the electrostatic protective circuit adopts the 4-MOS-transistor constitution to a value three times to five times as large as the gate width (W) of the MOS transistor when the electrostatic protective circuit adopts the 2-MOS-transistor constitution.

As has been explained heretofore, according to the present invention, by arranging the electrostatic protective circuits in the inside of the liquid crystal display panel, even in and after the cell cutting step, the breakdown voltage against the static electricity can be enhanced thus preventing electrostatic breakdown attributed to static electricity.

Further, the electrostatic protective circuits can adopt the 2-MOS-transistor constitution or the 4-MOS-transistor constitution and hence, the electrostatic protective circuits can be arranged with the least arrangement space.

Still further, not to mention that the electrostatic protective circuit can be manufactured in an n-MOS single channel process, it is possible to set a current which flows in the electrostatic protective circuits during usual driving extremely low.

Here, in this embodiment, the electrostatic protective circuit may be arranged only in the pixel part (ARSB) shown in FIG. 3 or the electrostatic protective circuit may be arranged only in a built-in circuit such as the inspection circuit (TEST), the video voltage selection circuit (VDSC), or the vertical scanning circuit (VSCA) shown in FIG. 3.

The present invention is not limited to the liquid crystal display device and is applicable to display devices in general including pixels such as an organic EL display device, for example.

Although the invention made by inventors of the present invention has been specifically explained in conjunction with the embodiment hereinafter, it is needless to say that the present invention is not limited to the above-mentioned embodiment and various modifications are conceivable without departing from the gist of the present invention.

What is claimed is:

1. A display device comprising:
a substrate;
a plurality of pixels formed in a pixel part; and
a plurality of video lines which applies video voltages to the plurality of pixels;
wherein an electrostatic protective circuit for protecting the pixel part is connected to the plurality of video lines;
wherein the electrostatic protective circuit for protecting the pixel part is connected between the plurality of video lines;
wherein an electrostatic protective circuit for protecting a peripheral circuit is connected between at least one video line and a reference voltage line to which a reference voltage is applied;
wherein the electrostatic protective circuit for protecting the pixel part is constituted of a pair of diodes which has cathodes thereof connected to each other;
wherein the electrostatic protective circuit for protecting the peripheral circuit is constituted of first to fourth diodes which are connected in series;
wherein the first diode and the second diode have cathodes thereof connected to each other;
wherein the third diode and the fourth diode have cathodes thereof connected to each other;
wherein the diode is a diode-connected MOS transistor; and
wherein the diode-connected MOS transistor which constitutes the first to fourth diodes which are connected in series has a gate width thereof set larger than a gate width of the diode-connected MOS transistor which constitutes the pair of diodes.

2. The display device according to claim 1, wherein the display device includes
a plurality of scanning lines which applies scanning voltages to the plurality of pixels, and
the electrostatic protective circuit for protecting the pixel part is connected between the plurality of scanning lines and the reference voltage line to which the reference voltage is applied.

3. The display device according to claim 2, wherein the display device includes a scanning circuit which applies the scanning voltages to the plurality of scanning lines, and
the electrostatic protective circuit for protecting the peripheral circuit is connected to a plurality of lines which is connected to the scanning circuit.

4. The display device according to claim 3, wherein
the electrostatic protective circuit for protecting the peripheral circuit is connected between the plurality of lines which is connected to the scanning circuit, and between the at least one line which is connected to the scanning circuit and the reference voltage line to which the reference voltage is applied.

5. The display device according to claim 1, wherein the display device includes
a counter voltage line which applies a counter voltage to the plurality of pixels, and
the electrostatic protective circuit for protecting the peripheral circuit is connected between the counter voltage line and the reference voltage line to which the reference voltage is applied.

6. The display device according to claim 1, wherein the display device includes
an inspection circuit to which one ends of the plurality of video lines on a side opposite to a side to which the video voltages are applied are connected, and
the electrostatic protective circuit for protecting the peripheral circuit is connected to a plurality of lines which is connected to the inspection circuit.

7. The display device according to claim 6, wherein
the electrostatic protective circuit for protecting the peripheral circuit is connected between the plurality of lines which is connected to the inspection circuit, and between the at least one line which is connected to the inspection circuit and the reference voltage line to which the reference voltage is applied.

8. The display device according to claim 1, wherein
at least one of the electrostatic protective circuit for protecting the pixel part and the electrostatic protective circuit for protecting the peripheral circuit is constituted of a pair of diodes which has cathodes thereof connected to each other.

9. The display device according to claim 1, wherein
at least one of the electrostatic protective circuit for protecting the pixel part and the electrostatic protective circuit for protecting the peripheral circuit is constituted of first to fourth diodes which are connected in series, wherein
the first diode and the second diode have cathodes thereof connected to each other, and
the third diode and the fourth diode have cathodes thereof connected to each other.

10. The display device according to claim 9, wherein the diode is a diode-connected MOS transistor.

11. The display device according to claim 1, wherein the gate width of the diode-connected MOS transistor which constitutes the first to fourth diodes which are connected in series is set to a value three times to five times as large as the gate width of the diode-connected MOS transistor which constitutes the pair of diodes.

12. A display device comprising:
a substrate:
a plurality of pixels which is formed in a pixel part;
a plurality of video lines which applies video voltages to the plurality of pixels; and
a video voltage selection circuit which selects the video voltages to be inputted to the pixels and applies the selected video voltages to the predetermined video lines among the plurality of video lines, wherein an electrostatic protective circuit for protecting a pixel part is connected to the plurality of video voltage inputting lines which inputs the video voltages to the video voltage selection circuit, and an electrostatic protective circuit for protecting a peripheral circuit is connected to the lines other than the video voltage inputting lines which are connected to the video voltage selection circuit.

13. The display device according to claim 12, wherein the electrostatic protective circuit for protecting the pixel part is connected between the plurality of video voltage inputting lines, and the electrostatic protective circuit for protecting the peripheral circuit is connected between the at least one video voltage inputting line and the line other than the at least one video voltage inputting line, between the plurality of lines other than the video voltage inputting lines, and between the line other than the at least one video voltage inputting line and a reference voltage line to which a reference voltage is applied.

14. The display device according to claim 12, wherein the display device includes a plurality of scanning lines which applies scanning voltages to the plurality of pixels, and the electrostatic protective circuit for protecting the pixel part is connected between the plurality of scanning lines and the reference voltage line to which the reference voltage is applied.

15. The display device according to claim 14, wherein the display device includes a scanning circuit which applies the scanning voltages to the plurality of scanning lines, and the electrostatic protective circuit for protecting the peripheral circuit is connected to a plurality of lines which is connected to the scanning circuit.

16. The display device according to claim 15, wherein the electrostatic protective circuit for protecting the peripheral circuit is connected between the plurality of lines which is connected to the scanning circuit, and between the at least one line which is connected to the scanning circuit and the reference voltage line to which the reference voltage is applied.

17. The display device according to claim 12, wherein the display device includes a counter voltage line which applies a counter voltage to the plurality of pixels, and the electrostatic protective circuit for protecting the peripheral circuit is connected between the counter voltage line and the reference voltage line to which the reference voltage is applied.

18. The display device according to claim 12, wherein the display device includes an inspection circuit to which one ends of the plurality of video lines on a side opposite to a side to which the video voltages are applied are connected, and the electrostatic protective circuit for protecting the peripheral circuit is connected to a plurality of lines which is connected to the inspection circuit.

19. The display device according to claim 18, wherein the electrostatic protective circuit for protecting the peripheral circuit is connected between the plurality of lines which is connected to the inspection circuit, and between the at least one line which is connected to the inspection circuit and the reference voltage line to which the reference voltage is applied.

20. The display device according to claim 12, wherein either the electrostatic protective circuit for protecting the pixel part or the electrostatic protective circuit for protecting the peripheral circuit is constituted of a pair of diodes which has cathodes thereof connected to each other.

21. The display device according to claim 12, wherein either the electrostatic protective circuit for protecting the pixel part or the electrostatic protective circuit for protecting the peripheral circuit is constituted of first to fourth diodes which are connected in series, wherein the first diode and the second diode have cathodes thereof connected to each other, and the third diode and the fourth diode have cathodes thereof connected to each other.

\* \* \* \* \*